(12) United States Patent
Vera et al.

(10) Patent No.: US 9,405,647 B2
(45) Date of Patent: Aug. 2, 2016

(54) REGISTER ERROR PROTECTION THROUGH BINARY TRANSLATION

(75) Inventors: Xavier Vera, Barcelona (ES); Javier Carretero Casado, Barcelona (ES); Matteo Monchiero, San Francisco, CA (US); Tanausu Ramirez, Barcelona (ES); Enric Herrero, Cardedeu (ES)

(73) Assignee: Intel Corporation, Santa Clara, CA (US)

( * ) Notice: Subject to any disclaimer, the term of this patent is extended or adjusted under 35 U.S.C. 154(b) by 105 days.

(21) Appl. No.: 13/994,697

(22) PCT Filed: Dec. 30, 2011

(86) PCT No.: PCT/US2011/068051
§ 371 (c)(1),
(2), (4) Date: Jun. 14, 2013

(87) PCT Pub. No.: WO2013/101165
PCT Pub. Date: Jul. 4, 2013

(65) Prior Publication Data
US 2013/0318401 A1 Nov. 28, 2013

(51) Int. Cl.
*G06F 11/00* (2006.01)
*G06F 11/263* (2006.01)
*G06F 9/45* (2006.01)

(52) U.S. Cl.
CPC .............. *G06F 11/263* (2013.01); *G06F 8/52* (2013.01); *G06F 11/004* (2013.01)

(58) Field of Classification Search
CPC .............. G06F 11/263; G06F 11/3648; G06F 11/3644; G06F 11/3636; G06F 11/362; G06F 11/3672; G06F 11/2294; G06F 11/3684

USPC ..................................................... 714/35, 32
See application file for complete search history.

(56) References Cited

U.S. PATENT DOCUMENTS

| | | | |
|---|---|---|---|
| 6,185,667 B1 * | 2/2001 | Abercrombie ...... | G06F 15/8023 712/11 |
| 7,689,804 B2 | 3/2010 | Vera et al. | |
| 7,757,040 B2 * | 7/2010 | Bellows et al. ............... | 711/112 |
| 8,560,924 B2 | 10/2013 | Fleischer et al. | |
| 8,826,257 B2 * | 9/2014 | Al-Otoom ................. | G06F 8/52 717/151 |
| 8,966,027 B1 * | 2/2015 | Brandwine ........... | G06F 15/177 709/200 |

(Continued)

FOREIGN PATENT DOCUMENTS

| | | |
|---|---|---|
| TW | 424183 | 3/2001 |
| TW | I245222 B | 12/2005 |

OTHER PUBLICATIONS

PCT International Search Report for PCT Counterpart Application No. PCT/US2011/068051, 3 pgs., (Sep. 26, 2012).

(Continued)

*Primary Examiner* — Yair Leibovich
(74) *Attorney, Agent, or Firm* — Nicholson De Vos Webster & Elliott LLP (57) ABSTRACT

Some implementations provide techniques and arrangements for detecting a register value having a life longer than a threshold period based, at least in part, on at least one code segment of a code being translated by a binary translator. For a register value detected as having a life longer than a threshold period, at least one instruction to cause an access of the detected register value during the life of the register value may be included in at least one translated code segment to be output by the binary translator.

19 Claims, 7 Drawing Sheets

(56) References Cited

U.S. PATENT DOCUMENTS

| | | | |
|---|---|---|---|
| 8,966,315 B2* | 2/2015 | Burn | G06F 11/1446 |
| | | | 711/173 |
| RE45,632 E* | 7/2015 | Stiffler | |
| 2005/0086463 A1* | 4/2005 | Quach | G06F 9/4411 |
| | | | 713/100 |
| 2006/0168473 A1* | 7/2006 | Sahoo et al. | 714/15 |
| 2009/0037783 A1* | 2/2009 | Vera et al. | 714/54 |
| 2011/0167296 A1* | 7/2011 | Fox | G06F 11/0793 |
| | | | 714/15 |

OTHER PUBLICATIONS

PCT Written Opinion of the International Searching Authority for PCT Counterpart Application No. PCT/US2011/068051, 4 pgs., (Sep. 26, 2012).

PCT Notification concerning Transmittal of International Preliminary Report on Patentability (Chapter I of the Patent Cooperation Treaty) for PCT Counterpart Application No. PCT/US2011/068051, 6 pgs., (Jul. 10, 2014).

Montesinos, P., et al. "Using Register Lifetime Predictions to Protect Register Files Against Soft Errors", URL http://iacoma.cs.uiuc.edu/iacoma-papers/ieeeshield.pdf, Aug. 29, 2008.

Lee, J., et al. "A Compiler Optimization to Reduce Soft Errors in Register Files", 2009 ACM IGPLAN/SIGBED Conference on Languages, Compilers, and Tools for Embedded Systems, Jun. 19-20, 2008, pp. 41-49, ACM, New York, USA.

Index of/iacoma-papers, filename=ieeeshield.pdf, URL http://iacoma.cs.uiuc.edu/iacoma-papers/, Department of Computer Science, University of Illinois at Urbana-Champaign, Aug. 29, 2008.

Office action and Search Report from Taiwan Patent Application No. 101149321, mailed Sep. 18, 2014, 7 pages.

Office action and Search Report from Taiwan Patent Application No. 101149321, mailed Apr. 29, 2015, 9 pages.

Office action and Search Report with English translation from Taiwan Patent Application No. 101149321, mailed Nov. 26, 2015, 8 pages.

* cited by examiner

```
ANALYZE AND PROFILE CODE TO BE AND/OR BEING
TRANSLATED BY A BINARY TRANSLATOR TO DETECT
REGISTER VALUES THAT HAVE A LIFE LONGER THAN
A THRESHOLD
202
```

↓

```
INCLUDE IN THE TRANSLATED CODE TO BE
EXECUTED, AT LEAST ONE INSTRUCTION TO CAUSE
ACCESS TO A REGISTER STORING THE DETECTED
REGISTER VALUE DURING THE THRESHOLD PERIOD
204
```

REGISTER ERROR PROTECTION THROUGH BINARY TRANSLATION

CROSS-REFERENCE TO RELATED APPLICATION

This patent application is a U.S. National Phase Application under 35 U.S.C. §371 of International Application No. PCT/US2011/068051, filed Dec. 30, 2011, entitled REGISTER ERROR PROTECTION THROUGH BINARY TRANSLATION.

TECHNICAL FIELD

This disclosure relates to the technical field of microprocessors.

BACKGROUND ART

Soft errors are an increasing problem. Also, the trend toward increasing the number of processor cores creates a need to add reliability features to reduce the per core failure rate, such as the failure in time (FIT) rate. Due to constraints such as latency and overhead, register files are currently protected only by parity, which is a problem when multiple strikes or multiple errors occur. Moreover, parity can only detect an odd number of errors. When registers store register values with long lives (i.e. the values are stored for long periods without being read), multiple errors may occur undetected. This problem is known as Silent Data Corruption.

One option to avoid Silent Data Corruption is scrubbing the register file. However, scrubbing the register file may have a significant impact on performance. Another option is using stronger error detection and correction codes in register files. However, stronger codes can create significant latency issues and may require greater area on a chip.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Overview

This disclosure includes techniques and arrangements for detecting long life register values during binary translation and shortening the lives of the detected register values by including instructions to access the register values in the code to be output by the binary translator. Some implementations may use a binary translator to detect register values that have a long life and to include instructions in translated code to shorten the lives of the detected register values. The detection of long life register values may be based on: 1) an analysis of code prior to translation; 2) an analysis of translated code; 3) run-time information regarding the translated code, or 4) any combination thereof.

Binary translation is a technique that may be used to create a version of a binary program originally executable on one processor-based platform that is, after translation, usable on a different processor-based platform. For example, a binary translator may convert a program intended for an Apple® PowerPC processor based platform into a program executable on an Apple platform based on an Intel® Core Duo® Processor. However, as used herein, binary translation should not be interpreted as limited to converting a program intended for execution on a first platform to a program executable on a second platform. Rather, as used herein, binary translation includes any rewriting of a binary program, such as for dynamic optimization of a program which is already executable on an executing platform. As such, herein, translated code refers to code that has been converted for use on a different platform, code that has been optimized, or code that has been both converted and optimized.

As alluded to above, programs, or portions of programs, can be optimized when the software is executed (i.e. optimized at "run-time"). This "dynamic optimization" can benefit from profiling information that includes much information relating the actual execution of the portions of the program executed. Programs can be profiled while operating on test data or while operating on actual end-user data. By profiling software in the end-user environment, the resulting profiling information reflects actual usage patterns, and can aid in the dynamic optimization process.

In a non-limiting example implementation, dynamic translation and optimization using dynamic profiling can be performed in two phases. The first phase (e.g., a cold translation phase) translates blocks (e.g., a sequence of instructions) of instructions for a first platform to blocks of instructions for a second platform. These cold blocks may or may not be optimized and are instrumented with instructions to measure the different aspects of the execution of the cold blocks. For example, the instrumentation instructions could count a number of times a respective cold block is executed or may compute a number of cycles occurring in the life of a register value. It should be noted that results obtained by instrumentation instructions are not necessarily precise, but rather may be estimates or approximations. After the cold block has been executed (or executed a sufficient number of times to give a reasonably reliable profile), the second phase (e.g., a hot translation phase) begins. In the hot translation phase, the cold blocks are optimized using the profile information generated during execution of the cold blocks. In some implementations, the cold blocks may not all be optimized, but rather only a subset may be optimized. For example, only cold blocks which are found to have long life register values or cold blocks which are frequently executed may be subjected to hot translation phase optimization.

Example Implementations

Figure 1:
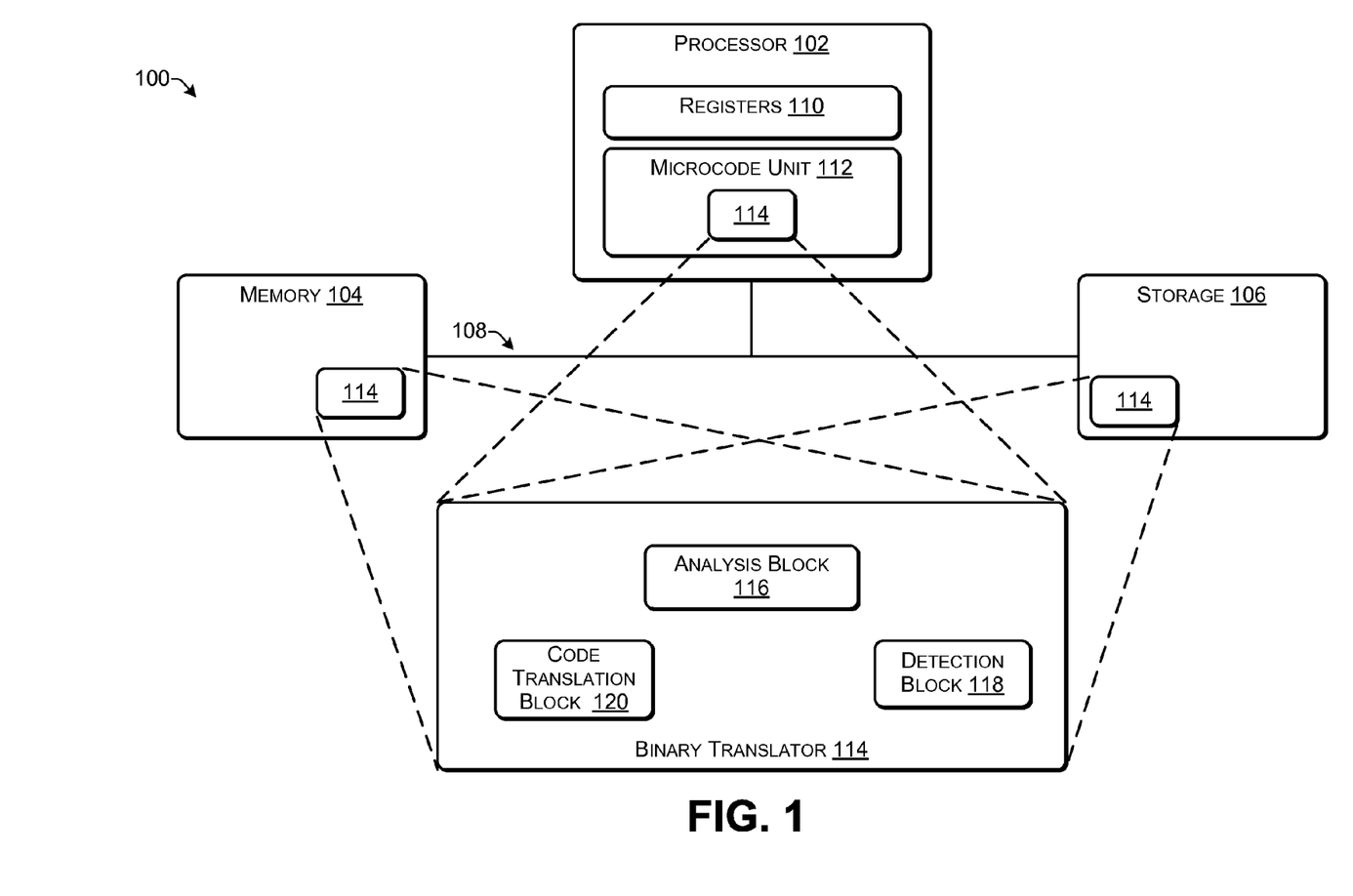
FIG. 1 illustrates an example system according to some implementations.

FIG. 1 illustrates an example framework of a processor based system 100 according to some implementations. System 100 is a processor based system including a processor 102, a memory 104 to store data and programs executable by the processor, and a storage unit such as a storage 106 all interconnected by a system bus 108. The processor 102 includes one or more registers 110 and a microcode unit 112.

In some implementations, a program embodying a binary translator 114 may be stored on the storage 106, loaded into memory 104 via the system bus 108 and executed by the processor 102 on data which may also be stored on the disk system and optionally in memory 104. In some other implementations, the binary translator 114 may be stored as firmware in the microcode unit 112 on the processor 102 rather than being loaded from memory 104 and storage 106.

The binary translator 114 includes an analysis block 116, a detection block 118, and a code translation block 120. In general, analysis block 116 analyzes an original code, run-time information and a translated code to generate profiling information. Detection block 118 receives the generated profiling information and a threshold value and, from these, identifies or detects register values which have lives longer than the threshold value. Code translation block 120 uses the profiling information and results generated by detection block 118 to generate translated code. Additional details of the binary translator 114 are described with respect to FIG. 3.

Figure 2:
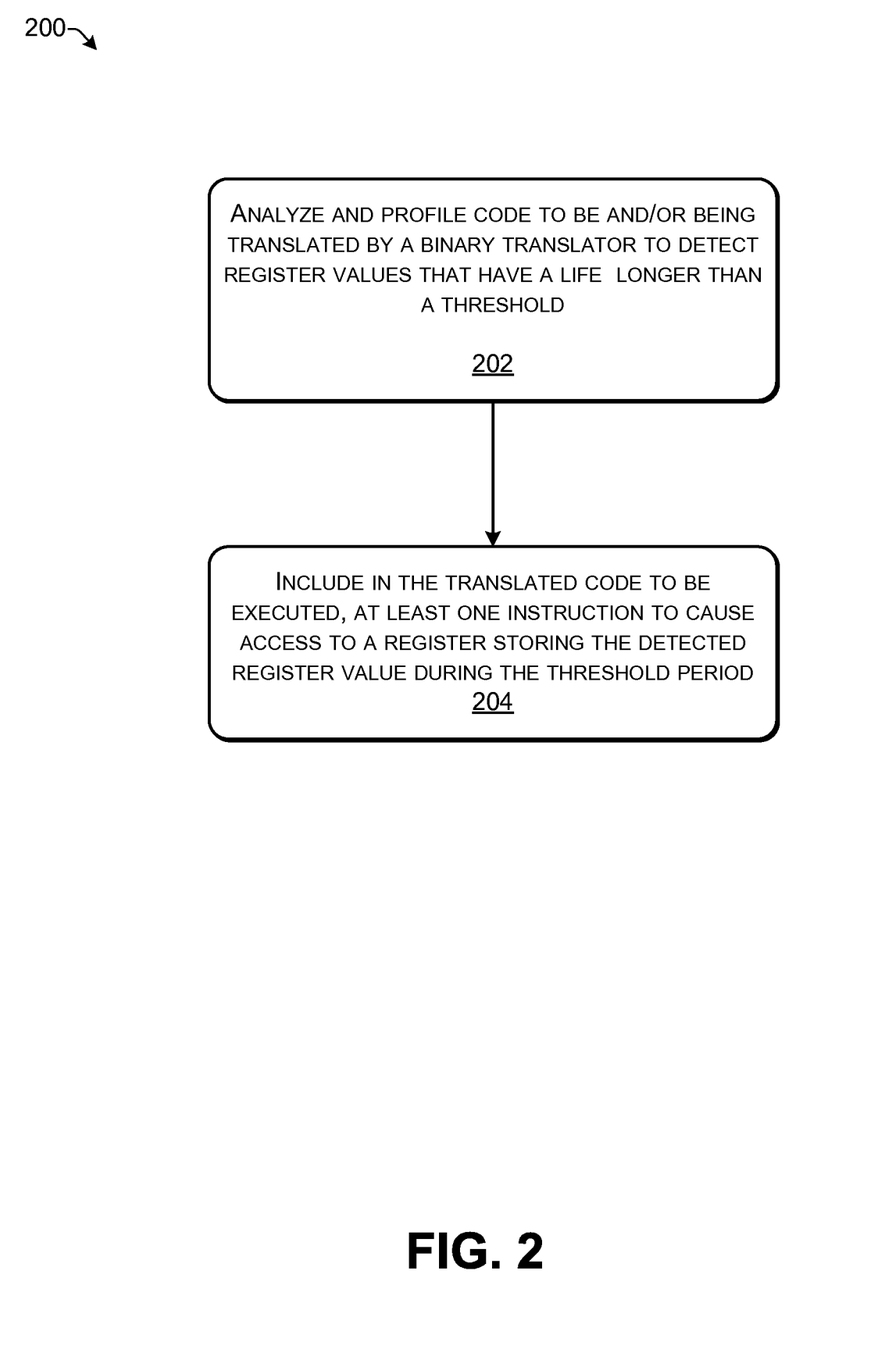
FIG. 2 illustrates an example process flow according to some implementations.

FIG. 2 illustrates an example process flow 200 according to an implementation in which long life register values are detected and instructions are included in translated code to shorten the lives thereof.

At 202, code which is to be and/or is being translated by a dynamic binary translator is analyzed and profiled to detect register values with lives longer than a threshold period. As stated above, the analysis and profiling may be performed using the code prior to translation, the translated code, run-time information of the translated code, or any combination thereof.

As used herein, examples of a life of a register value are 1) a period between the register value being stored in a register R and the next access of register R and 2) the period between an access and a next access of register R while the register value is stored therein. An example of a register value which would be detected as having a life longer than a threshold period of ten instructions is a register value which is stored in a register at instruction number one (1) and not accessed again until, for example, instruction number eighteen (18). Since the number of instructions in the life of the register value is greater than ten, the register value is detected as having a life longer than the threshold period. As used herein, accessing a register is meant in its broadest sense in that the register value is used in some manner, (i.e. read, moved, copied, used in an operation, etc.) Also, herein, the lives of register values and the threshold period may be discussed in terms of a number of instructions between two points in the original code. However, this is to simplify discussion herein and should not be interpreted as a limitation. The lives of register values and the threshold period could be measured in terms of any metric which can be used as an indication of a period between two points in the execution of code, such as a number of seconds between the two points, a number of instructions in the translated code between the two points, a number of instructions retired between the two points, or a number of clock cycles that occur between the two points. Further, in some implementations, the threshold period may be a programmable threshold. The programmable threshold may be varied based on various conditions such as voltage levels, an altitude of the executing computer, ambient or internal temperatures, and silent data corruption FIT targets based on a market segment.

At 204, for a register value detected as having a life longer than the threshold, at least one instruction to cause an access to the register storing the register value is included in the translated code at a point during or at the end of the threshold period. Continuing the above example of a register value which is stored at instruction number one (1) and not accessed again until instruction number eighteen (18), a instruction to copy the register value into a temporary location could be inserted before or after instruction number ten (10) to ensure that the life of the register is limited to ten or less instructions.

Figure 3:
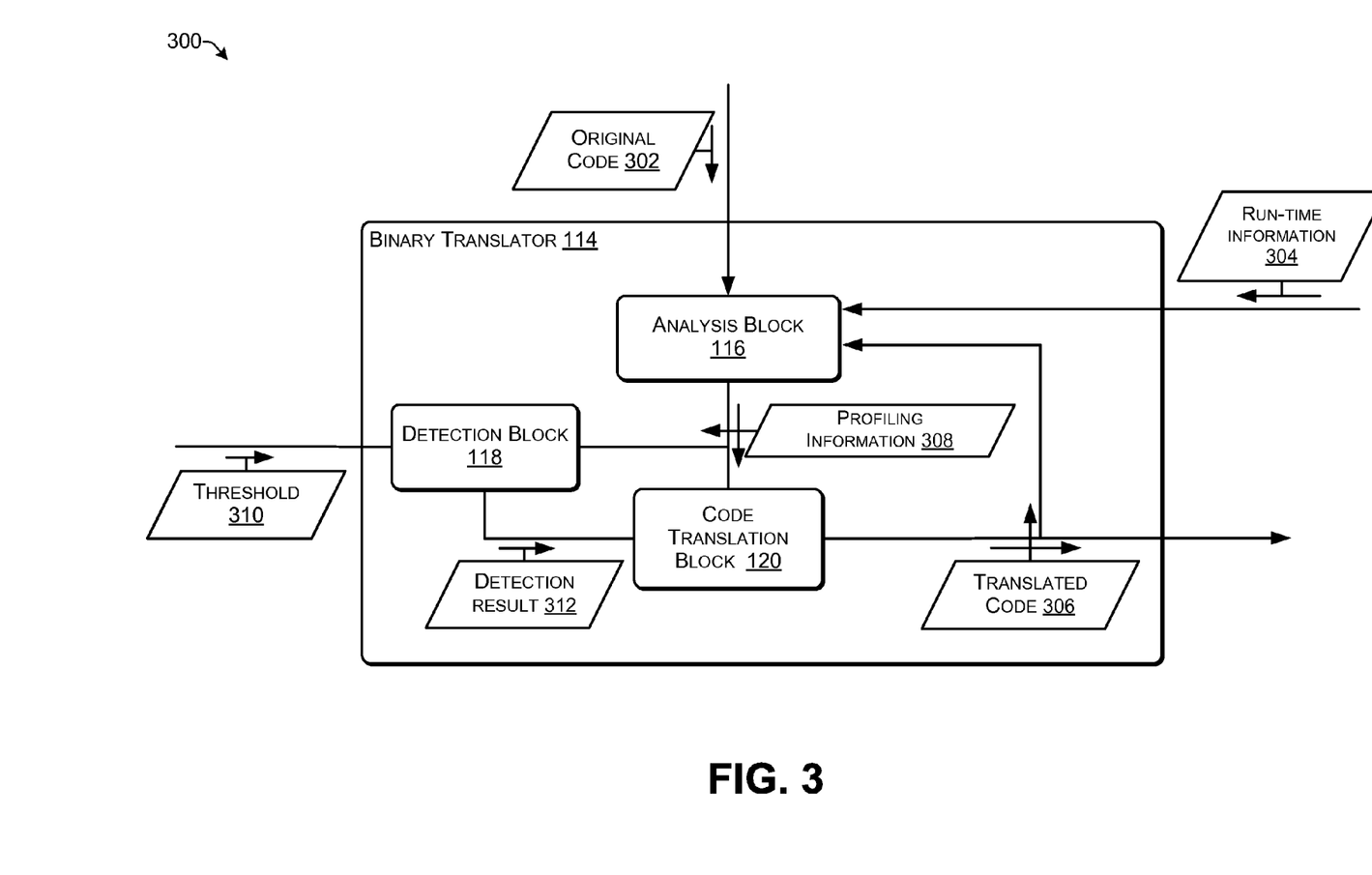
FIG. 3 illustrates select components of an example logic block diagram according to some implementations.

FIG. 3 illustrates a block diagram of an example logical arrangement 300 according to one implementation. The logical arrangement 300 may be implemented as several components of hardware each configured to perform one or more functions, may be implemented in software or firmware where one or more programs are used to perform the different functions, or may be a combination of hardware, firmware, and/or software. For purposes of discussion, the binary translator 114 will be discussed as a set of software routines stored in a computer readable storage medium.

In operation, analysis block 116 analyzes the original code 302, run-time information 304 and translated code 306 to generate profiling information 308. The profiling information 308 may be generated in the manner discussed above using dynamic profiling. The profiling information is not limited to any particular measurement or datum but simply provides information needed by detection block 118 and code translation block 120.

Detection block 118 receives the profiling information 308 and a threshold value 310. From these, detection block 118 identifies or detects register values which have lives longer than the threshold 310. The detection block 118 then outputs detection result 312 including the identification of the detected register values, an indication of locations to insert instructions to access the registers storing the detected register values and/or any information that may be used by the code translation block 120 to include instructions to access the registers storing the detected register values during the threshold period.

Code translation block 120 uses profiling information 308 and detection result 312 to generate translated code 306. In generating the translated code 306, the code translation block 120 may 1) translate original code 302 from code executable on a first platform to code executable on a second platform; 2) optimize the original code 302 if the original code is already executable by the executing platform; 3) optimize the translated code 306; 4) insert instructions in the translated and/or optimized code to access the registers storing the detected long life register values during the threshold period; or 5) a combination thereof.

In alternative implementations, the detection block 118 may be integrated into the analysis block 116 or the detection block 118 may receive the original code 302, run-time information 304, translated code 306 and threshold 310 and detect long life register values independent of analysis block 116 and the profiling information 308.

Figure 4:
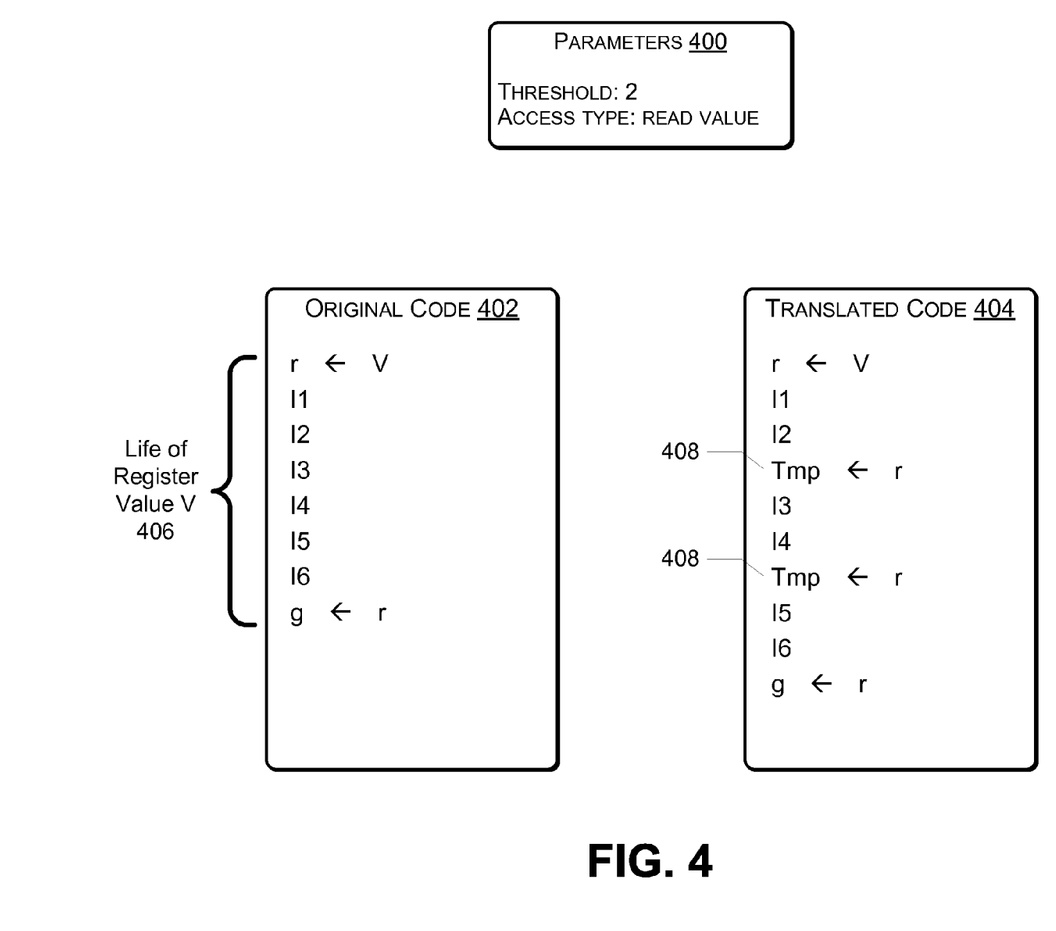
FIG. 4 illustrates an example translation according to some implementations.
Figure 5:
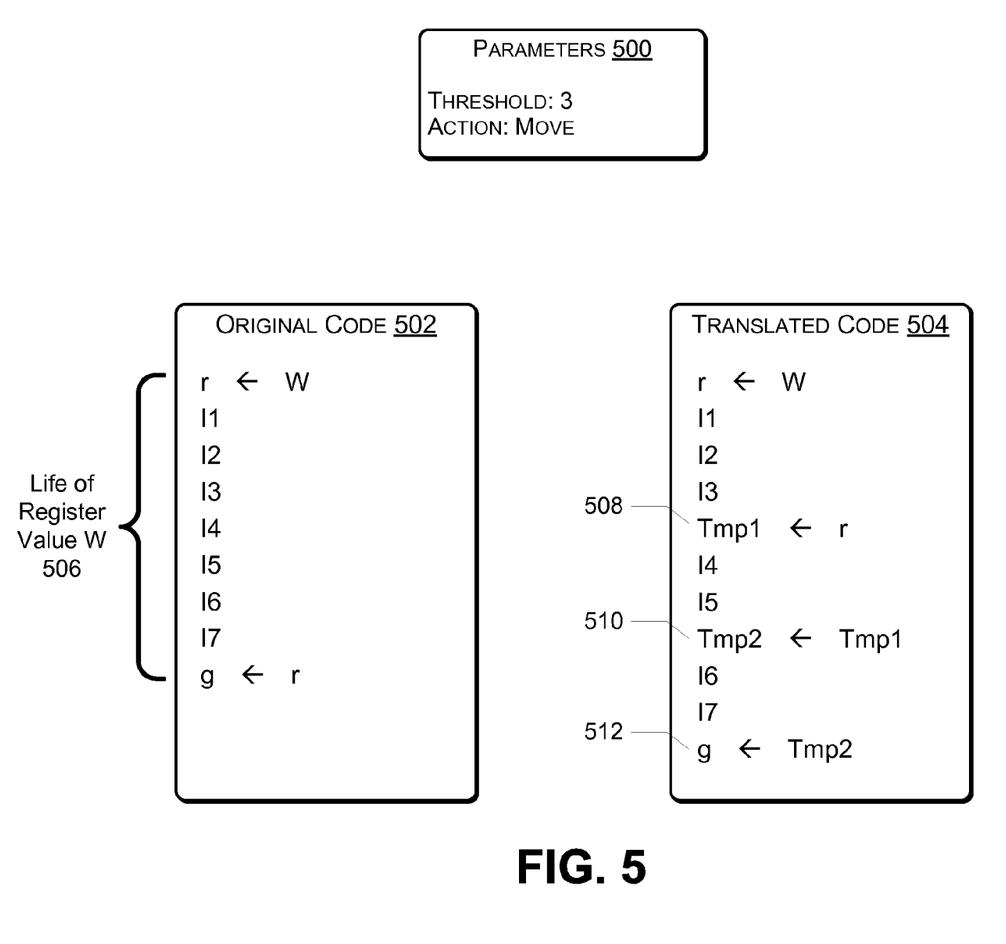
FIG. 5 illustrates an example translation according to some implementations.
Figure 6:
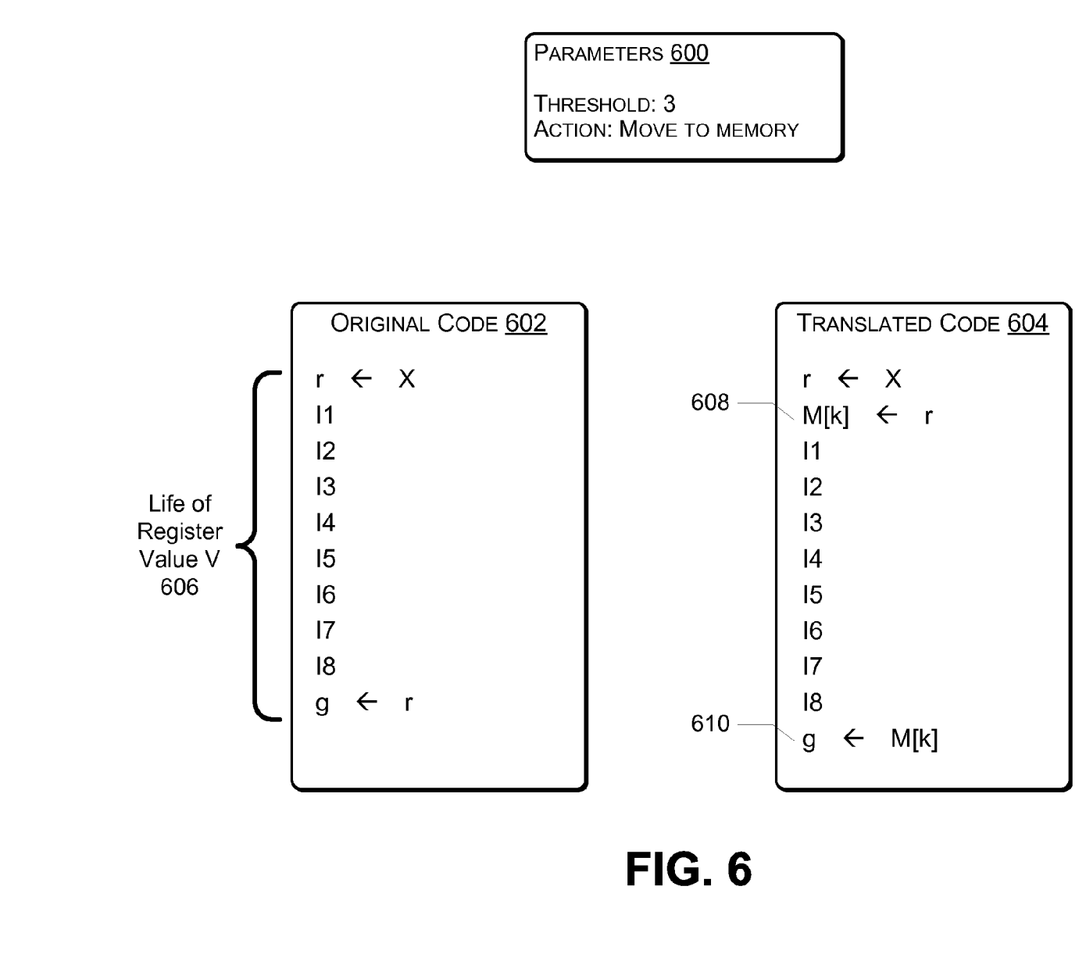
FIG. 6 illustrates an example translation according to some implementations.

FIGS. 4, 5, and 6 illustrate example inputs and outputs of binary translator 114 according to some implementations. For simplicity of explanation, in the examples of FIGS. 4, 5, and 6 it is assumed that the original codes have already been, do not need, or will not be translated from one platform to another or optimized. As such, only the detection of long life register values and the inclusion of instructions to shorten the register value lives will be discussed. Further, in the discussion related to FIGS. 4, 5, and 6, the threshold period is a number of instructions between two points in the code.

FIG. 4 illustrates an example input and output of binary translator 114 in which parameters 400 for the binary translator 114 are a threshold period of two (2) and the access type used to shorten long register value lives is a "read" action (i.e.

loading the register value into a temporary location). Specifically, the binary translator receives original code 402 and outputs translated code 404 using parameters 400.

In operation, binary translator 114 analyzes the original code 402 to determine the lives of register values and to detect register values with lives longer than the threshold period. As illustrated in FIG. 4, the life 406 of register value V is six. Specifically, six instructions (I1, I2, I3, I4, I5 and I6) occur between the storage of value V in register r and the next instruction to access register r (the copying of value V into register g. As such, register value V is detected as being a long-life register value.

Based on this detection, the binary translator 114 includes instructions 408 in translated code 404. Instructions 408 cause the value V stored in register r to be read into register Tmp between instructions I2 and I3 and again between instructions I4 and I5. Thus, the life of register value V is reduced to the threshold period of two instructions between storages and/or accesses. In this way, silent data corruption which could not be detected by parity due to multiple errors occurring over the long life of register value V in the original code 402 may be prevented because multiple errors are less likely to occur during the shortened life of register value V in translated code 404.

FIG. 5 illustrates an example input and output of binary translator 114 in which parameters 500 for the binary translator 114 are a threshold period of three instructions (3) and the access type used to shorten long register value lives is a "move" action (i.e. moving the register value to a different register). Specifically, the binary translator receives original code 502 and outputs translated code 504 using parameters 500.

In operation, binary translator 114 analyzes the original code 502 to determine the lives of register values and to detect register values with lives longer than the threshold period. As illustrated in FIG. 5, the life 506 of register value W is seven. Specifically, seven instructions (I1, I2, I3, I4, I5, I6, and I7) occur between the storage of value W in register r and the next instruction to access register r (the copying of value W into register g). As such, register value W is detected as being a long-life register value.

Based on this detection, the binary translator 114 includes instructions 508 and 510 in the translated code 504. Instruction 508 causes the value W to be moved to register Tmp1 between instructions I3 and I4. Next, because the number of instructions between instruction 508 and the original end of the life of register value W is four, which is greater than the threshold of three, binary translator 114 inserts another instruction 510 to move the value W from Tmp1 to register Tmp2. Because the four instruction life is not a multiple of the threshold of three, binary translator 114 may vary from inserting the instruction 510 at the end of the threshold period to more evenly split the life of the register value. This is shown in translated code 504 with the placement of instruction 510 between instructions I5 and I6 rather than at the end of the threshold period (between instructions I6 and I7).

At the original end of the life of register value W, instruction 512 is included in translated code 504. Instruction 512 loads register value W into register g from register Tmp2 rather than register r. Thus, the life of register value W is prevented from exceeding the threshold period of three instructions between accesses. Further, the use of "moves" further prevents any register from even storing a register value for longer than the threshold period. In this way, silent data corruption which could not be detected by parity due to multiple errors occurring over the long life of register value W in the original code 502 may be prevented because multiple errors are less likely to occur during the shortened life of register value W in translated code 504 and because of the reduced period for which any given register stores register value W.

As discussed above, in the original code 502, the life of register value W was greater than the threshold but not a multiple of the threshold. To handle this, binary translator 114 inserted multiple access instructions and subdivided the last period of the life of register value W in original code 502 into periods smaller than the threshold to evenly distribute the inserted accesses. However, implementations are not limited to this approach. The manner in which long lives of register values are subdivided can be customized according to the details of the implementation. For example, in an implementations which is less aggressive, the register value lives may be shortened into periods that are substantially longer than the detection threshold value. In short, many variations on the manner in which long register value lives are shortened would be apparent to one of ordinary skill in the art in view of the disclosure provided herein.

FIG. 6 illustrates an example input and output of binary translator 114 in which parameters 600 for the binary translator 114 are a threshold period of three instructions (3) and the access type used to shorten long register value lives is a "move to memory" action (i.e. moving the register value to cache or system memory). Specifically, the binary translator receives original code 602 and outputs translated code 604 using parameters 600.

In some situations, moving a register value to cache or to system memory may be preferable to keeping the register value in the register file. For example, in the case of very long life register values, the overhead generated by including many "read" and "move" type accesses over that life may be greater than the overhead generated by moving the value to cache or system memory and then back to the register file. Because cache and system memory use stronger error detection and error correction capabilities than the parity protection typically used for registers, values in cache and system memory can have long lives with less chance of errors such as silent data corruption.

In operation, binary translator 114 analyzes the original code 502 to determine the lives of register values and to detect register values with lives longer than the threshold period. As illustrated in FIG. 6, the life 606 of register value X is eight. Specifically, eight instructions (I1, I2, I3, I4, I5, I6, I7, and I8) occur between the storage of value X in register r and the next instruction to access register r (the copying of value X into register g). As such, register value X is detected as being a long-life register value.

Based on this detection, the binary translator 114 includes instructions 608 and 610 in translated code 604. Instruction 608 causes the value X to be moved to memory location M[k] before instruction I1. Instruction 610 is included at the original end of the life of register value X and causes register value X to be loaded into register g from memory location M[k]. Thus, the life of register value X is prevented from exceeding the threshold period of three instructions between accesses. In this way, silent data corruption which could not be detected by parity due to multiple errors occurring over the long life of register value X in the original code 502 may be prevented. Further, the use of the "move to memory" access type removes the need for multiple "read" and "move" type accesses which might have a serious impact on the performance of translated code 604.

In the preceding description, for purposes of explanation, numerous specific details are set forth in order to provide a thorough understanding of the described implementations, however, one skilled in the art will appreciate that many other implementations may be practiced without these specific details.

While several examples have been illustrated herein for discussion purposes, numerous other configurations may be used and thus implementations herein are not limited to any particular configuration or arrangement. For example, the discussion herein refers to signals being output and received by particular components of the binary translator. This should not be taken as a limitation as such communication need not be direct and the particular components need not necessarily be separate functional units. These and other variations would be apparent to one of ordinary skill in the art in view of the disclosure provided herein.

The processes described herein are only examples provided for discussion purposes. Numerous other variations will be apparent to those of skill in the art in light of the disclosure herein. Further, while the disclosure herein sets forth several examples of suitable frameworks, architectures and environments for executing the techniques and processes herein, implementations herein are not limited to the particular examples shown and discussed.

The processes illustrated herein are shown as a collection of operations in a logical flow graph, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation. Any number of the described blocks can be combined in any order and/or in parallel to implement the process, and not all of the blocks need be executed.

Example System Architecture

Figure 7:
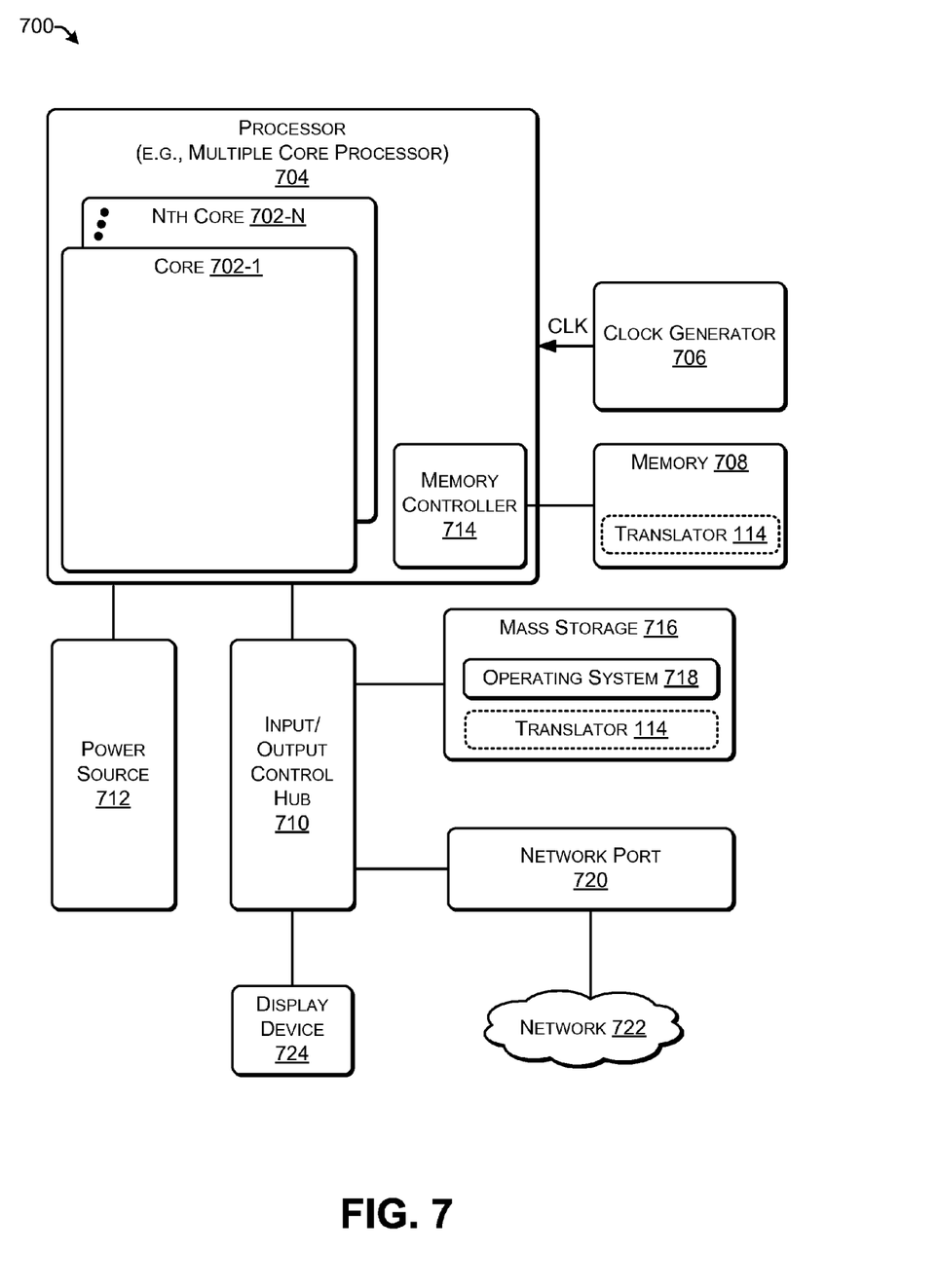
FIG. 7 illustrates an example system in which some implementations may operate.

FIG. 7 illustrates select components of an example architecture of a system 700 as an example of the environment in which some implementations may operate. System 700 may encompass any of a variety of devices, such as a desktop computing device, a laptop computing device, tablet computing device, netbook computing device, wireless computing device, or a server computing device, as several nonlimiting examples.

The system 700 may include one or more cores 702 in one or more processors, such as a processor 704, a clock generator 706, a memory 708 (e.g., random access memory (RAM)), an input/output control hub 710, and a power source 712 (e.g., a battery or a power supply). The processor 704 may include a single core 702-1 or multiple cores 702-1, . . . , 702-N (where N is an integer >1), such as a first core 702-1 and one or more additional cores, up to and including an $N^{th}$ core 702-N. The processor 704 may include a memory controller 714 to enable access (e.g., reading from or writing) to the memory 708. In some implementations, at least one of the memory 708 and mass storage 716 may include may store instructions, which when executed by the processor 704, cause processor 704 to perform the functions of the binary translator 114.

The clock generator 706 may generate a clock signal that is the basis for an operating frequency of one or more of the N cores 702 of the processor 704. For example, one or more of the N cores 702 may operate at a multiple of the clock signal generated by the clock generator 706.

The input/output control hub 710 may be coupled to a mass storage 716. The mass storage 716 may include one or more non-volatile storage devices, such as disk drives, solid state drives, and the like. An operating system 718 may be stored in the mass storage 716.

The input/output control hub 710 may be coupled to a network port 720. The network port 720 may enable the system 700 to communicate with other devices via a network 722. The network 722 may include multiple networks, such as wireline networks (e.g., public switched telephone network and the like), wireless networks (e.g., 802.11, code division multiple access (CDMA), global system for mobile (GSM), Long Term Evolution (LTE) and the like), other types of communication networks, or any combination thereof. The input/output control hub 710 may be coupled to a display device 724 that is capable of displaying text, graphics, and the like.

As described herein, the processor 704 may include multiple computing units or multiple cores. The processor 704 can be implemented as one or more microprocessors, microcomputers, microcontrollers, digital signal processors, central processing units, state machines, logic circuitries, and/or any devices that manipulate signals based on operational instructions. Among other capabilities, the processor 704 can be configured to fetch and execute computer-readable instructions stored in the memory 708 or other computer-readable media.

The memory 708 is an example of computer storage media for storing instructions which are executed by the processor 704 to perform the various functions described above. The memory 708 may generally include both volatile memory and non-volatile memory (e.g., RAM, ROM, or the like). The memory 708 may be referred to as memory or computer storage media herein, and may be a non-transitory media capable of storing computer-readable, processor-executable program instructions as computer program code that can be executed by the processor 704 as a particular machine configured for carrying out the operations and functions described in the implementations herein.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Conclusion

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

What is claimed is:

1. A processor comprising:
   a plurality of registers;
   an instruction generation logic to generate at least one instruction to read information from at least one register of the plurality of registers in order to detect whether the at least one register of the plurality of registers contains erroneous information; and
   detection logic to detect at least one register of the plurality registers that is to store information that will not be accessed for longer than a threshold period based, at least in part, on at least a portion of a code being translated by a binary translator.

2. The processor as recited in claim 1, wherein the instruction generation logic is to generate the at least one instruction to read information from the at least one register detected by the detection logic.

3. The processor as recited in claim 1, further comprising:
   an analysis logic to analyze at least a portion of the code being translated by the binary translator; and
   wherein the detection logic is to detect the at least one register that is to store the information that will not be accessed for longer than the threshold period based, at least in part, on a result of an analysis performed by the analysis logic.

4. The processor as recited in claim 1, wherein the detection logic is to detect the at least one register that is to store the information that will not be accessed for longer than the threshold period based, at least in part, on dynamic profiling of at least a portion of the code by the binary translator.

5. The processor as recited in claim 1, wherein the threshold period is programmable.

6. A system comprising:
   a memory;
   a processor coupled to the memory, the processor comprising:
      a plurality of registers;
      an instruction generation logic to generate at least one instruction to move information from at least one register of the plurality of registers to at least one other register of the plurality of registers in order to help prevent the information from becoming corrupt; and
      a detection logic to detect at least one register of the plurality registers that is to store information that will not be accessed for longer than a threshold period based, at least in part, on at least a portion of a code being translated by a binary translator.

7. The system as recited in claim 6, wherein the instruction generation logic generates the at least one instruction to move information from the at least one register detected by the detection logic.

8. The system as recited in claim 6, the processor further comprising:
   an analysis logic to analyze at least a portion of the code being translated by the binary translator; and
   wherein the detection logic is to detect the at least one register that is to store the information that will not be accessed for longer than the threshold period based, at least in part, on a result of an analysis performed by the analysis logic.

9. The system as recited in claim 6, wherein the detection is based, at least in part, on dynamic profiling of at least a portion of the code by the binary translator.

10. The system as recited in claim 6, wherein the threshold period is programmable.

11. A processor comprising:
    a plurality of registers; and
    a logic to cause information stored in at least one of the plurality of registers to be stored into a memory location based at least in part on a determination that the information will be stored in the at least one of the plurality of registers for at least a threshold period; and
    a detection logic to detect at least one register of the plurality registers that is to store information that will not be accessed for longer than a threshold period based, at least in part, on at least a portion of a code being translated by a binary translator.

12. The processor as recited in claim 11, wherein the instruction generation logic generates at least one instruction to cause information stored in the at least one register detected by the detection logic to be stored into a memory location.

13. The processor as recited in claim 11, further comprising:
    an analysis logic to analyze at least a portion of the code being translated by the binary translator; and
    wherein the detection logic detects the at least one register that is to store the information that will not be accessed for longer than the threshold period based, at least in part, on a result of an analysis performed by the analysis logic.

14. The processor as recited in claim 11, wherein the detection is based, at least in part, on dynamic profiling of at least a portion of the code by the binary translator.

15. The processor as recited in claim 11, wherein the threshold period is programmable.

16. A method comprising:
    detecting, by a processor comprising a plurality of registers, a register that is to store a register value that will not be accessed for longer than a threshold period based, at least in part, on at least one code segment of a code being translated by a binary translator; and
    generating at least one instruction to cause an access of the detected register during a life of the register value.

17. The method as recited in claim 16, wherein the threshold period is programmable.

18. A non-transitory computer-readable medium maintaining instructions to be executed by a processor to cause the processor to perform operations comprising:
    detecting a register that is to store a register value that will not be accessed for longer than a threshold period based, at least in part, on at least one code segment of a code being translated by a binary translator; and
    causing the binary translator to include, in at least one translated code segment to be output by the binary translator, at least one instruction to cause an access of the detected register during a life of the register value.

19. The non-transitory computer-readable medium as recited in claim 18, wherein the threshold period is programmable.

* * * * *